United States Patent [19]
Brent

[11] 3,727,581
[45] Apr. 17, 1973

[54] LIVE ANIMAL AIRCRAFT TRANSPORT SYSTEM

[75] Inventor: William Donald Brent, Toronto, Ontario, Canada

[73] Assignee: W. D. Brent Manufacturing Ltd., Malton, Ontario, Canada

[22] Filed: June 16, 1971

[21] Appl. No.: 153,523

[52] U.S. Cl............119/17, 214/38 BA, 244/137 R
[51] Int. Cl. ................................................A01k 29/00
[58] Field of Search..............119/17; 244/137 R; 214/38 BA

[56] References Cited

UNITED STATES PATENTS

| | | | |
|---|---|---|---|
| 3,026,071 | 3/1962 | Barcellona et al. | 244/137 R |
| 3,263,832 | 8/1966 | Williams, Jr. et al. | 214/38 BA |
| 3,357,372 | 12/1967 | Bader | 244/137 R X |
| 3,578,145 | 5/1971 | Kuehl | 214/38 BA |
| 3,662,712 | 5/1972 | Singer | 119/17 |

Primary Examiner—Hugh R. Chamblee
Attorney—Cavanagh & Norman

[57] ABSTRACT

The following specification discloses a system and apparatus organising the loading, transport and delivery of live animals over great distances within a period of time during which feeding is rendered unnecessary and permitting health inspection prior to loading thus to achieve immediate delivery to the premises of the buyer without deterioration of the condition of the animals and sets forth a container structure and assembly adapted to be loaded, weighed, stored and transferred to an aircraft and locked thereon and at its destination to be unloaded and shipped directly to the purchaser in the combination of elements of apparatus and system described.

7 Claims, 10 Drawing Figures

INVENTOR
WILLIAM D BRENT
BY Cavanagh & Norman

INVENTOR
WILLIAM D BRENT
BY *Cavanagh & Norman*

INVENTOR
WILLIAM D BRENT
BY Cavanagh & Norman

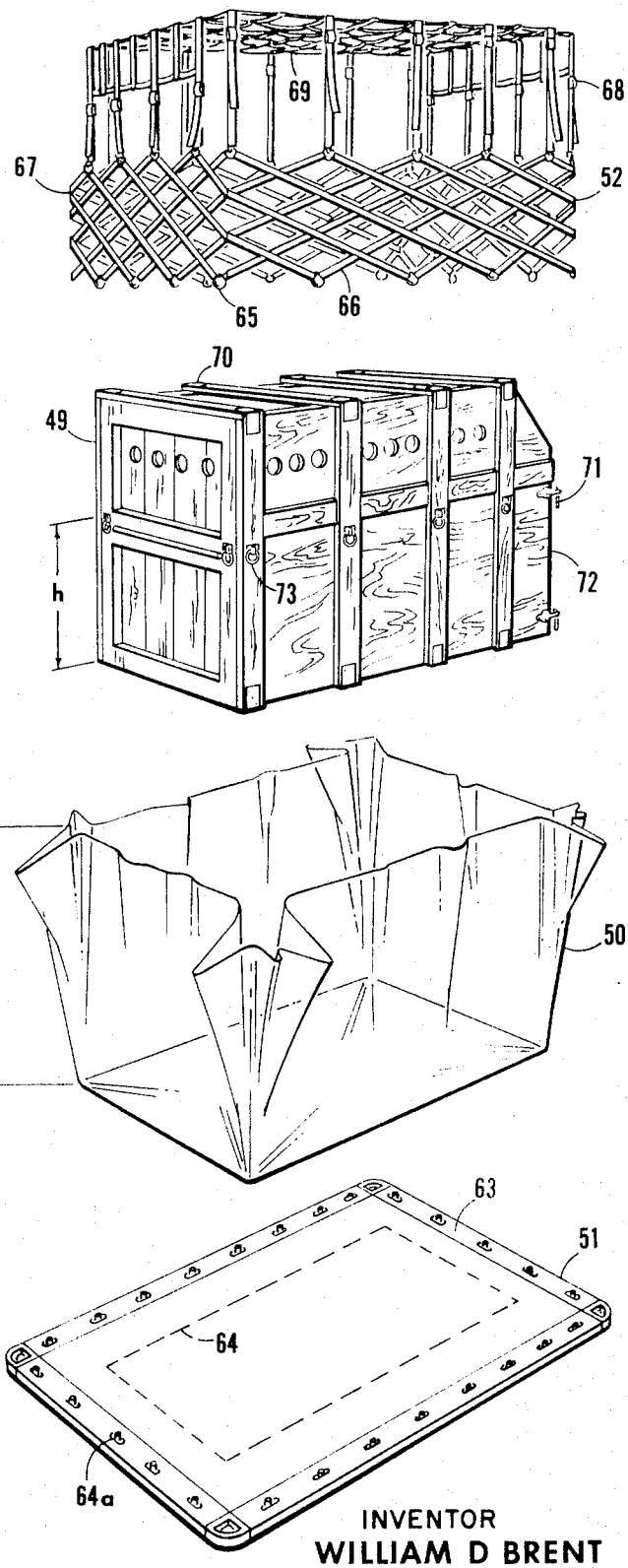

INVENTOR
WILLIAM D BRENT
BY Cavanagh & Norman

LIVE ANIMAL AIRCRAFT TRANSPORT SYSTEM

This invention relates to a long-distance system and apparatus for loading, transporting and delivering live animals in unchanged condition.

Transportation of live animals by truck, rail and shipping suffers from a severe disadvantage that, if the time element involved between loading and delivery exceeds the order of about 12 hours, feeding of the live animals becomes necessary. Over longer periods of time, in the absence of feeding or watering, an animal may become unruly or suffer motion sickness, in either case leading to excess urination, regurgitation or diarrhea giving rise to severe dehydration. Especially in sea voyages of many days duration a large percentage of animals die from various causes associated with and due to dehydration. Reconditioning of the animal for a period of at least 2 weeks is practiced as an essential after delivery. In shipments between countries, over distances in excess of 1,000 miles and of particular interest to the art in which the present invention relates, a recovery period in association with health inspection requires the immediate impounding of the animals by health and customs authorities at the point of delivery. This increases the cost of transportation as to time period for the recovery of the proceeds of sale, the added cost of animal recovery, feeding and the like and the loss occasioned by animal mortality rate.

Many attempts have been made to utilise air transportation techniques for the delivery of live animals in a short period of time over substantial distances. While the condition of the animal at delivery by this technique is greatly enhanced, substantial damage to the aircraft usually occurs as a result of urine leakage. In addition, provision is ordinarily made for watering just prior to loading into the aircraft and often during flight or at the destination at which the animal is stored in the container for undue lengths of time for health examination and the like leading to deterioration in the condition of the animals. Some animals are subject to air sickness and within a very few hours by excess urination can subject themselves to severe dehydration. Such air transport systems are generally characterised by long delays immediately prior to aircraft loading and long delays immediately after aircraft unloading, adding as much as a total of 12 to 36 hours of confinement of the animal over and above the flight time. As a result, feeding and watering are essential and substantial additional costs rapidly accumulate.

Prior transportation of live animals by air has generally been done in bar cages built into the aircraft within which the animals can shift against one another or built into a section of a transport aircraft walled or caged off into which the animals are loaded. When the animals are unloaded from such a cage they ordinarily stampede as a result of which substantial numbers must be destroyed due to injury. As contrasted with ocean shipping, wherein the loss of live animal weight is of the order of 10 percent average and the loss of animal life is ordinarily between the order of 5 to 10 percent, air freight, even by prior art techniques, reduces the weight loss to the order of 1 or 2 percent. The loss of life by reason of non-uniform air circulation conditions in the aircraft leading to sickness and the movement of a number of animals within one enclosure leads to severe animal damage.

It is a main object of the invention to provide a containerized system for air transportation of live animals in which the period prior to loading and flight (hereinafter referred to as preflight loading) and the period after the flight (hereinafter referred to as after flight loading) is shortened to less than 4 hours total and is preferably of elapsed time at each end not exceeding 1 hour whereby the preparation of animal inventory for a flight may begin no earlier than 2 hours before flight time and the release of the animals from the delivery airport may occur no later than 2 hours after transport aircraft touch-down.

It is another object of the invention to provide in a live animal air cargo system the combination of a lock-type pallet, an animal container strapped to said pallet and a urine receptacle envelope about said container between the pallet and container without provision for water or feeding in association with said container.

It is a further object of the invention to provide the system and apparatus set forth herein in which the containers, when fastened into the transport aircraft define in association with air system devices of the aircraft and devices of the invention, air ducting means adapted to maintain a more uniform circulation of air for each container in the aircraft during flight, thus to control air temperature and reduce the onset of air sickness in animals due to changing air conditions.

It is a still further object of the invention to provide a system and apparatus for the air shipping of live animals by means of which health inspection of animals, especially in a foreign country, may be accomplished by representatives of such foreign countries in the country of shipment immediately prior to aircraft loading.

It is a still further object of the invention to provide a system and apparatus for air freighting of live animals from an airport in one country to an airport in another country within an elapsed time in excess of flight time no greater than 4 hours from the receiving of animals at the shipping airport to delivery of animals from a destination airport, thus to shorten the time of receipt of payment from the buyer at destination.

It is a still further object of the invention to provide a system and apparatus for air freighting of live animals in which each animal is individually confined either in a single container or in a multiple individual stall type container.

Other objects of the invention will be appreciated by a study of the following specification, taken in conjunction with the accompanying drawings.

In the drawings:

FIG. 7 is an exploded view of a container assembly according to the invention embodying an anchorage pallet, a urine envelope, a container structure and a tie net for fastening the latter to the pallet.

Figure 1:
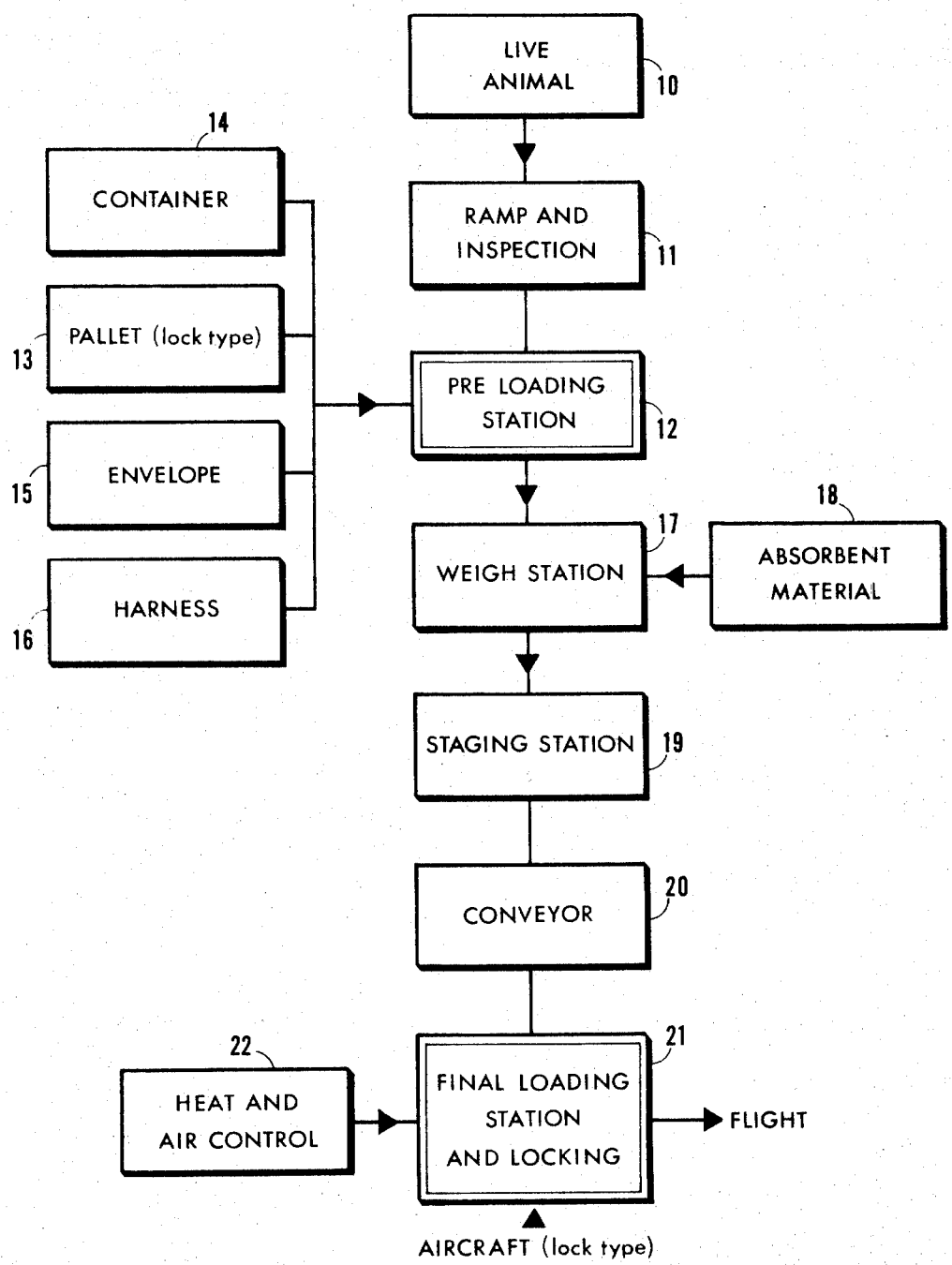
FIG. 1 is a system schematic of the invention showing the system at an airport shipping station.

With reference to the drawings and in particular FIG. 1 the invention concerns a system and apparatus for loading and unloading animals into and from a transport aircraft. The loading system of the invention is shown in FIG. 1, it being understood that the same system may be employed in reverse to provide the unloading system of the invention.

In FIG. 1 the live animal at 10 proceeds through a ramp and inspection unit 11 to a preloading station 12 at which the animal is loaded onto a lock type pallet 13 carrying a container 14 having an individual stall for the animal, the container being surrounded by a waterproof envelope 15 in its lower regions and being attached to the pallet by a harness 16. The preloading system 12 will ordinarily be located at the weigh station 17 at which the total weight of the animal, container, pallet, envelope and harness is recorded after the addition of absorbent material 18, such as sawdust, vermiculite, or the like, to the container. The loaded container then proceeds to a stating station 19 awaiting flight loading and at the time of loading proceeds by a conveyor 20 into the aircraft representing a final loading station 21 within which the container is locked and heat and air controls 22 installed prior to flight.

Figure 2:
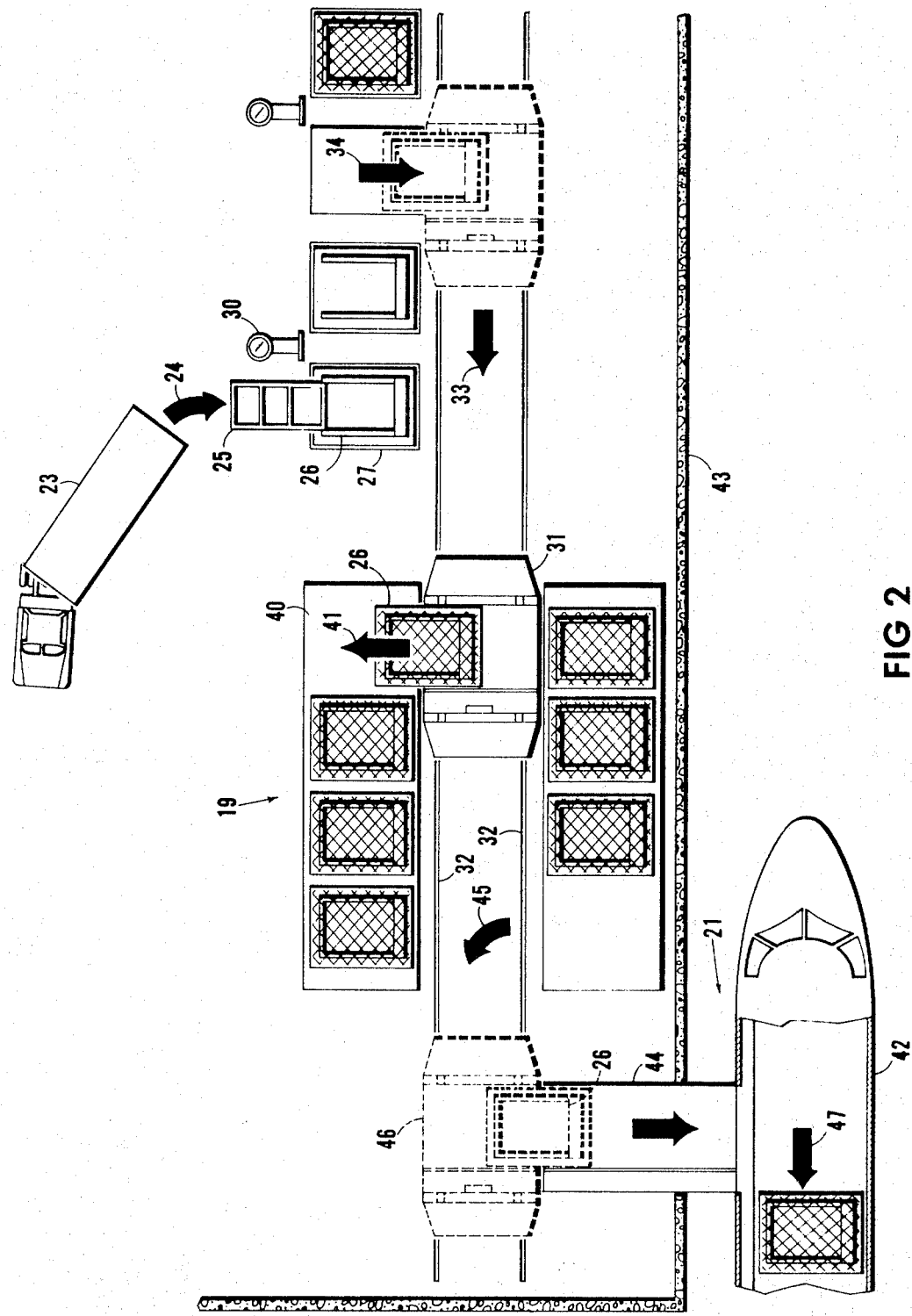
FIG. 2 is a diagrammatic plan view of the apparatus employed in the airport shipping station of FIG. 1.
Figure 3:
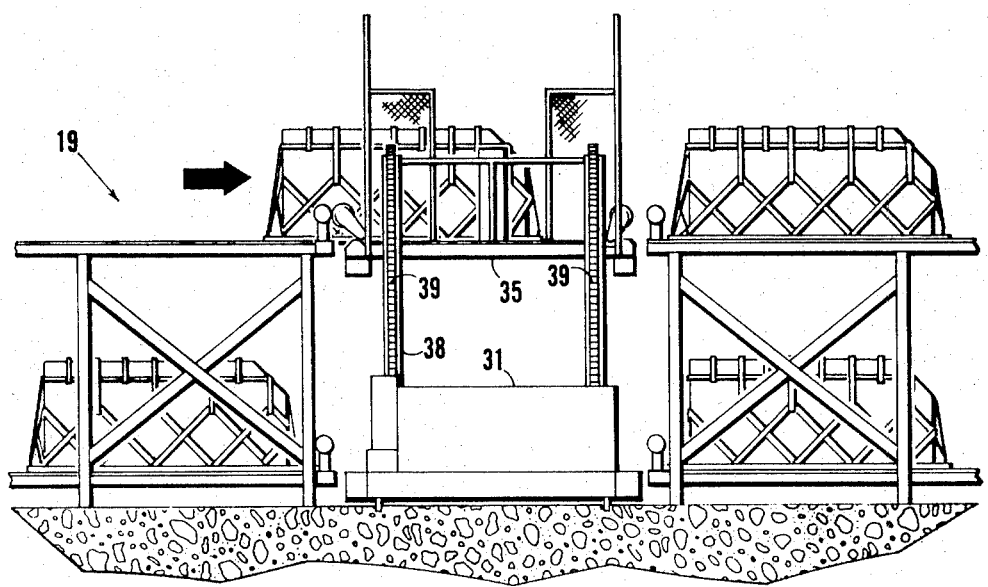
FIG. 3 is an elevation of staging station storage of FIGS. 1 and 2 showing a rail conveyor transfer system for handling loaded live animal containers of the invention.
Figure 4:
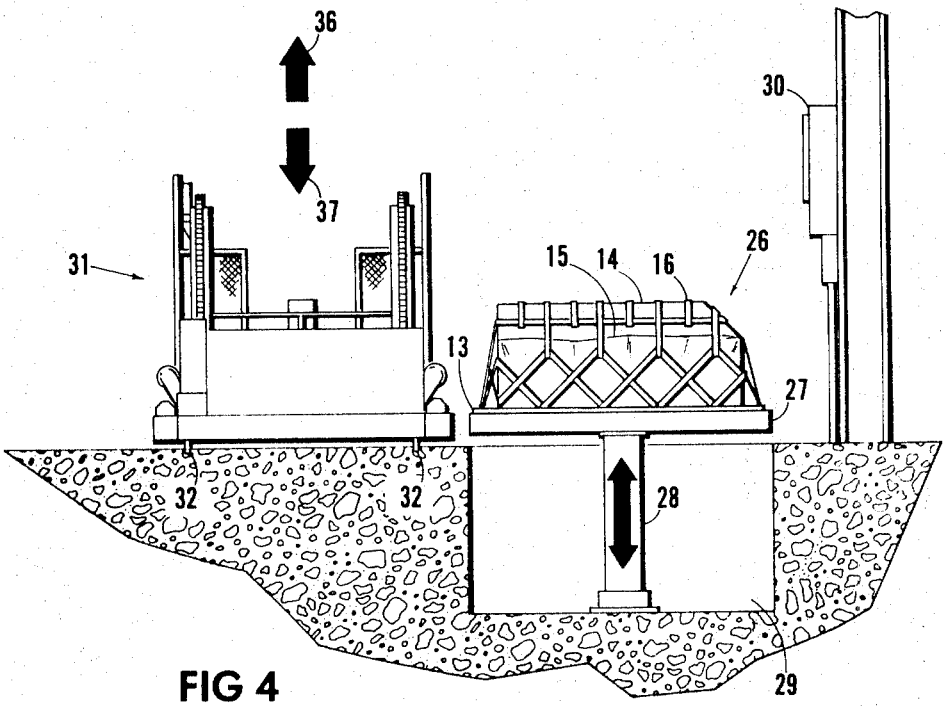
FIG. 4 illustrates the system of FIG. 3 located at the weigh station of FIGS. 1 and 2.

The organisation of the system and apparatus indicated by the flow diagram of FIG. 1 is evident in more detail in FIGS. 2 to 4. In FIG. 2 the animal transport 23 unloads (as by arrow 24) live animals one by one through an inspection shute or ramp 25 to a live animal container 26 of the invention, the latter being characterised by a single stall for each animal, said container resting on a platform 27 on air or hydraulic lift column 28 (See FIG. 4) in floor pit 29 and connecting with weight indicator 30. At this point absorbent material (See 18 of FIG. 1) is added to the container and then harness 16 is rigidly fastened about the container 14 and urine envelope 15 to hold the same in tensioned hold down assembly with pallet 13.

The animal loading container assembly 26, after being weighed is transferred by rail transfer vehicle 31 supported by rails 32 along pathway 33 by operators pushing the container 26 on rollers (not shown) on the upper surface of platform 27 in the direction of arrow 34 (FIG. 2) onto raisable platform 35 of vehicle 31. Platform 35 is moveable upwardly and downwardly as indicated by arrows 36, 37 on vertical posts 38 having driven endless chains thereon fastened to platform 35, the latter carrying rollers on its upper surface (not shown). Accordingly, as the vehicle 31 carries the loaded container to the multiple storey staging station 19 it is located as indicated in bold lines in FIG. 2 opposite an empty staging area 40 therein and platform 35 raised or lowered as required to deposit the container 26 in the direction of arrow 41 onto such staging area. The plurality of containers 26 indicated in the staging area 19 of FIG. 2 contain the required weight of animals for an air shipment. The time for makeup of such shipment will ordinarily be less than 1 hour's duration and aircraft loading will ordinarily be completed for 13 containers within 1 hour before aircraft takeoff.

At 1 hour before takeoff the combination of the system of the invention permits transport aircraft 42 to be located at the final loading station 21 next to building 43 into which the conveyor loading ramp 44 extends to the transfer vehicle tracks 32 or pathway 33. In aircraft loading, the transfer vehicle 31 picks up a loaded container 26, such as from storage area 44 as indicated by arrow 45 to transport same to the position 46 of transport vehicle 31 indicated in chain lines at which the container is delivered onto conveyor 44 and conveyed into aircraft 42 for handling in the direction of arrow 47 to cargo space in which it is locked in place in a manner hereinafter described in more detail.

Figure 5:
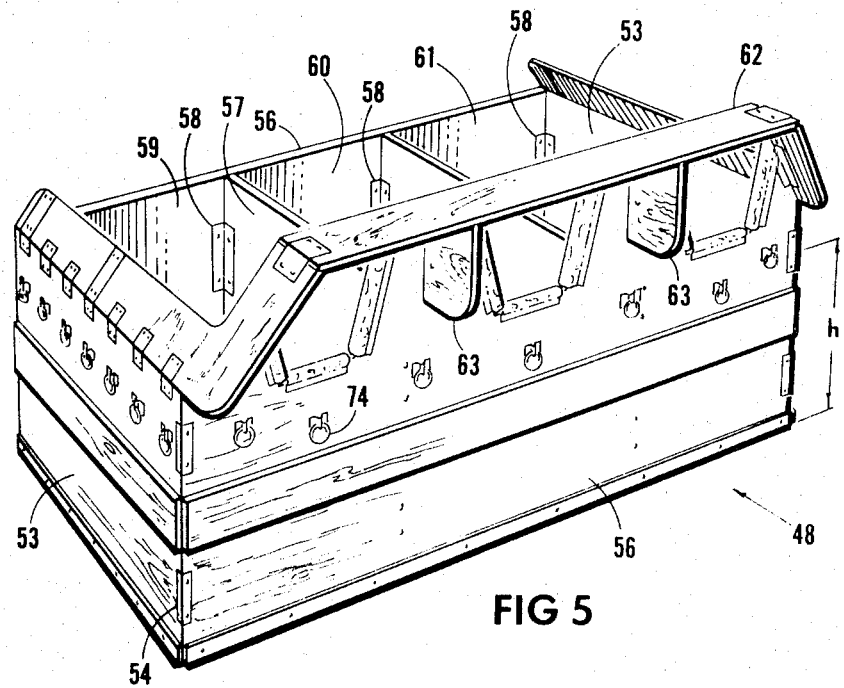
FIG. 5 is a perspective view of a multiple stall form of live animal container of the invention and suitable for horses.
Figure 6:
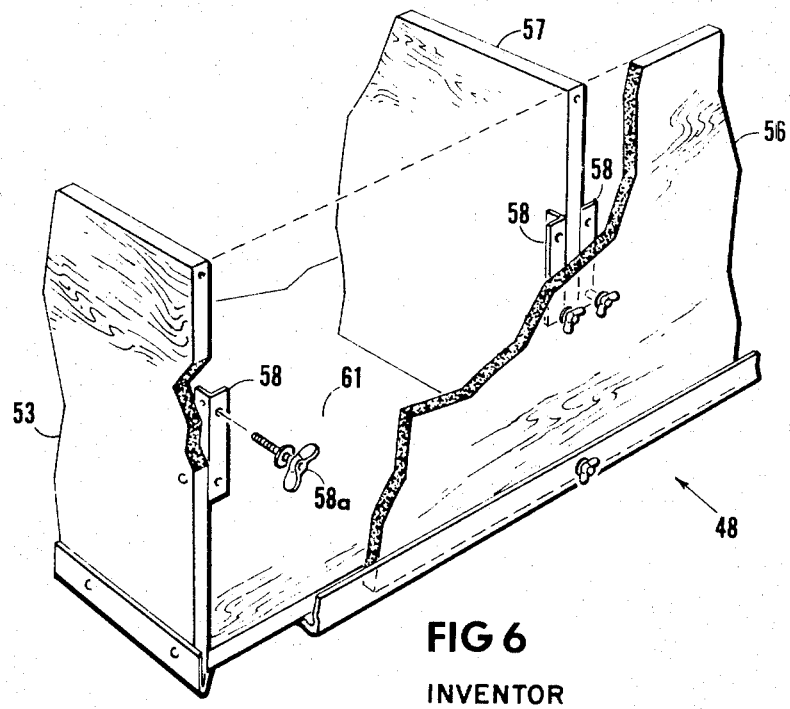
FIG. 6 is a rear perspective view of the container of FIG. 5 revealing the connection of the rear wall thereto.

The individual stall animal container of the invention as shown in FIGS. 5 and 6 comprises the single storey multiple stall structure 48 or the single stall structure 49 of FIG. 6. Each is of cheap rigid preferably expendable construction and is adapted to be loaded with an animal or animals as the case may be when standing within the urine envelope 50 on the locking pallet 51 and is connected to the latter by the tensioned strap net 52 (FIG. 7).

The stall structure 48 of FIG. 5 is of the multiple individual stall type especially adapted for the transport of horses. Heavy plywood side panels 53 are bolted or rivetted by metal angle plates both interior and exterior as at 54 to the end panels 55, 56, the interior being divided by the dividing walls 57 and rivetted or bolted by mounting plates 58 to end walls 55 to provide three horse stalls 59, 60 and 61. The rear end panel 56 in the side by side multiple stall container of the invention is continuous (FIG. 6) and is preferably connected to brackets 58 by large wing bolts 58a. Whatever form of releasable hardware is employed for mounting the removeable rear wall 56 to brackets 58 it will be understood that same will be selected mainly with a view to least cost having regard to the desired expendable nature of the container herein to the extent that such rear wall fastening may embody temporary bolting, nailing or clamping adapted to be destroyed to enable the removal of the rear wall 56. Where the head of the animal is intended to protrude from a stall, the container of the invention provides a head cover or fender 62 having depending stall dividers or blinker panels 63.

In FIG. 7 a rigid pallet 51 of predetermined size such as 88 inches by 125 inches or 84 inches by 124 inches, having a standard rigid metal locking rim or frame 63 with strap eyelets 64a thereon, is adapted to receive in the area indicated by chain lines 64 the plastic sheet envelope 50, the latter having placed therein the container of the invention such as a multiple stall container 48 of FIGS. 5 and 6 or the single storey container 49 shown in FIG. 7. The container and envelope are strapped to pallet 51 by a conventional strap cargo net 52 having strap eyelet connecting fittings 65 at the lower extremeties 66 of the strap network 67, the latter being adjustable by tension buckles 68 to cause the cover or roof netting 69 to tension over the upper surfaces 70 of container 49 to hold the latter in strapped down located assembly in palate 51.

The container 49 is again of relatively simple expendable construction according to the invention, being specially adapted to contain a breed stock bull or the like in relatively close confinement and having no provision for water or feed and having a rear panel (not shown) removeably mounted such as by pin lock mechanism 71 to the side walls 72. If desired, the strap net 52 may also be tied to the intermediate tie rings 73 of the container, thus to eliminate the necessity of using the roof netting position 69 of the strap network 67. The tension rings 74 of container 48 of FIGS. 5 and 6 may be similarly employed in which event it is unnecessary for the envelope 50 to be of an effective height $h$ extending above the corresponding height $h$ of the rings 73, 74 of the container shown. It will be understood that the animal is loaded into the container on the pallet while the envelope at least in the region of the entrance door is relaxed, and the anchoring net is also relaxed for passage of the animal through the rear opening of the container. The rear panel of the container is then pinned or bolted in place. The envelope 50 is raised about the container and the strap net 52 is then tensioned preferably in eyelets 73 or 74 as the case may be.

Figure 8:
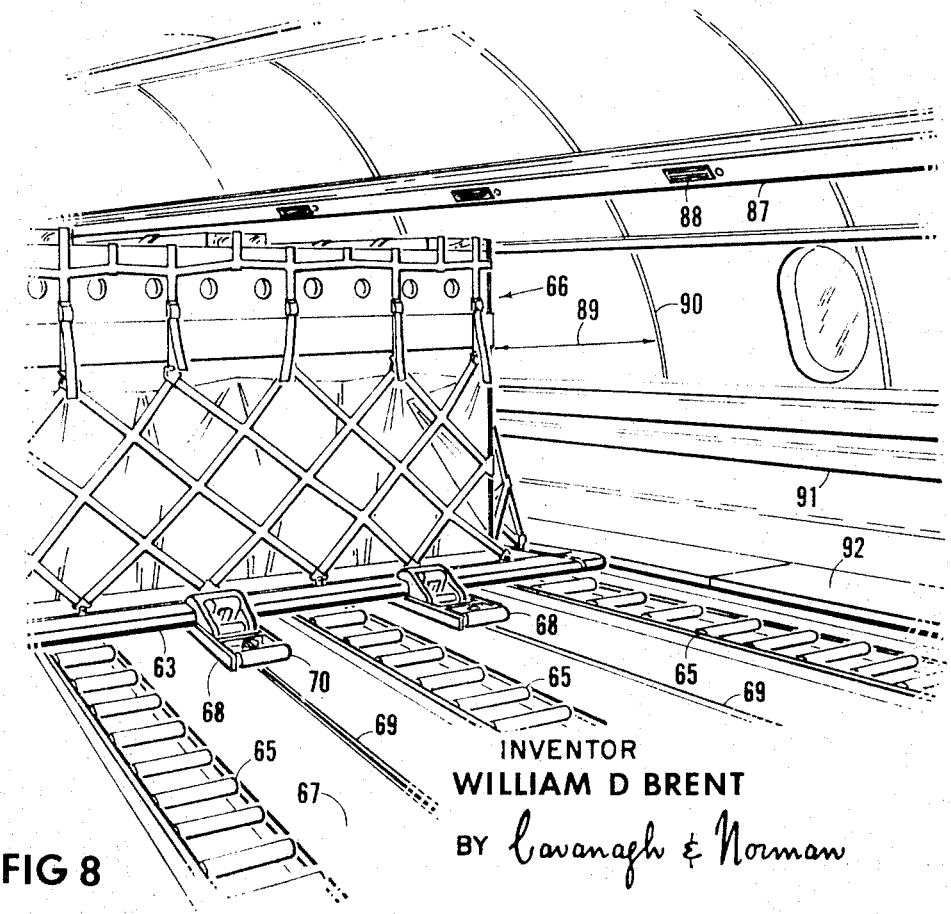
FIG. 8 is a perspective view of a typical interior of a transport aircraft modified in accordance with the invention to provide adequate air ducting and showing a typical container of the invention locked in place according to the system herein.

Preferably the assembly of the components of FIG. 7, the loaded animal and the tensioning of the strap net locking the container and envelope to the pallet will occur more conveniently at the weigh station 17 (FIG. 1) at which absorbent material 18 is introduced. This assembly, hereinafter referred to as a loaded container, and which comprises the four components including a pallet, a waterproof envelope, a container within the envelope and an external strapping net connecting the container over the envelope to the pallet is then handled as a unit from the weigh station through staging station and conveyor to final loading station within the aircraft to be locked into the aircraft in the manner indicated in FIG. 8.

Transport aircraft of existing kinds adapted for the transport of a sufficient weight of live animals to provide economical shipment is represented by an aircraft of such size of accommodation as to embody conventional conveyor roller track means 65 over which a loaded pallet 51 may be moved with facility by manual labour to a desired location within the aircraft for lockdown and which is adapted to accommodate at least 12 such pallets.

Figure 9:
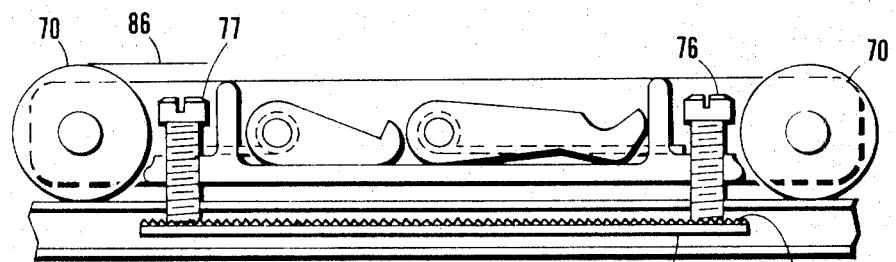
FIG. 9 is a sectional view of one form of locking clamp used in an aircraft as shown in FIG. 8 being revealed in the unlocked position.
Figure 10:
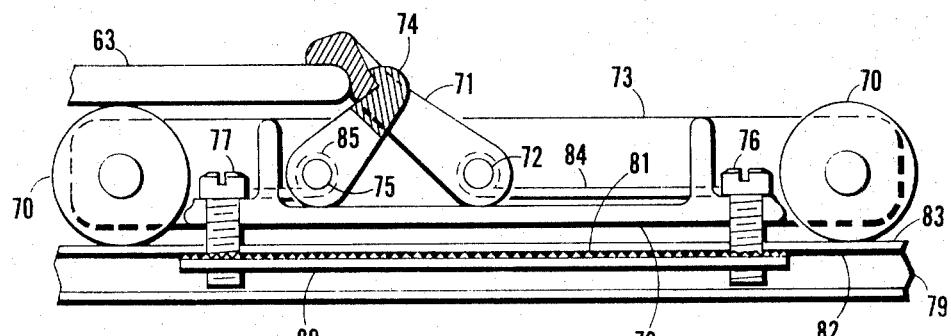
FIG. 10 illustrates the locking device of FIG. 9 in the position of its components locking the pallet and container of the invention in place in the aircraft.

When rolled into place, a loaded container 66 is locked to the aircraft floor structure 67 by slidable locking clamps 68 moveable in structural slotted rails 69 and having thereon rollers 70 of a height conforming to that of rollers 65 and adapted as shown in FIGS. 9 and 10 to cause a pallet frame 63 to be gripped by the swingable clamp member 71 swingable on pin 72 of clamp frame 73 and locked in place by retaining locking member 74 swingable from fixed shaft 75 in frame 73. The frame 73 is clamped in a desired position of attachment by locking screws 76, 77 passing freely through the base 78 of frame 73 between the enclosed slotted floor rails 79 to threadably engage in locking palate 80 having upper surface gripping serations 81 adapted to be drawn into firm locking engagement with the undersurface 82 of upper flange 83 of the rails 79. Springs 84, 85 bias the clamping arm 71 and locking arm 74 to the normally flat positions indicated in FIG. 9 so that all upper surfaces of the frame 73 and members thereof are normally below the line 86 representing maximum height of rollers 68 of the pallet device. In order to move the pallet clamps or anchors 68 into position it is merely necessary to use a screw driver to undo the locking screws 76, 77. As an alternative screws 76, 77 and gripping plate 80 may be replaced with a conventional type of bayonet locking screw adapted to pass into the rail gap 69 and when turned 90° to lock into the flanges 83 of the rails. In such form the anchorage clamp 68 may be inserted and locked into any desired location in the rails 69. At least three such pallet anchorage devices are required transversely of the aircraft on each forward and rearward edge of the pallet frame 63.

The invention provides air duct means 87 having vents 88 adapted in association with a gap 89 between the container 66 and one side wall 90 of the aircraft 91 defined by a walkway 92 to serve as a conduit for air circulation and to supply of air by vents 88 individually to each container either directly into or at a short distance from e from each container, thus to achieve as closely as possible a uniform temperature of air in the animal shipping section of the aircraft. This is especially important if air sickness is to be avoided for the continuous circulation of air maintains uniform temperature and himidity conditions thus avoiding the sensitivity of the animal to any such change.

I claim as my invention:

1. A live animal aircraft tranport system comprising: a plurality of disposable containers; a rectangular rigid pallet of predetermined size; a waterproof envelope on said pallet adapted to receive said container therein; strap means anchoring said container within said envelope to said pallet; a loading station at which each container is loaded with one animal for each stall of the container; a staging station and weigh station associated with said loading station; means for conveying a loaded pallet supported container from said staging station to an aircraft; and lock anchorage devices in said aircraft for anchoring the container loaded pallets therein.

2. The system of claim 1 and air ducts in said aircraft associated with loaded containers therein and directing air to each container.

3. The system of claim 1 and a container handling device moveable along a predetermined pathway between said loading station and said aircraft loading conveyor, said staging station being located along said pathway between said loading station and said conveyor.

4. The system of claim 1 and a loaded container weighing device at said loading station.

5. The system of claim 1 and absorbent material in each container stall.

6. The system of claim 1 in which one entire sidewall only is removeable from said container for the entry and removal of an animal to and from any stall of the container.

7. The system of claim 1 in which each container embodies a separate stall for each animal contained thereby.

* * * * *